(12) United States Patent
Liu et al.

(10) Patent No.: US 10,311,133 B2
(45) Date of Patent: Jun. 4, 2019

(54) CHARACTER CURVE GENERATING METHOD AND DEVICE THEREOF

(71) Applicant: CIENET TECHNOLOGIES (BEIJING) CO., LTD., Beijing (CN)

(72) Inventors: Xibin Liu, Beijing (CN); Liang Zheng, Beijing (CN)

(73) Assignee: CIENET TECHNOLOGIES (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/576,876

(22) PCT Filed: May 30, 2016

(86) PCT No.: PCT/CN2016/083910
§ 371 (c)(1),
(2) Date: Nov. 27, 2017

(87) PCT Pub. No.: WO2016/188493
PCT Pub. Date: Dec. 1, 2016

(65) Prior Publication Data
US 2018/0165256 A1   Jun. 14, 2018

(30) Foreign Application Priority Data
May 28, 2015 (CN) .......................... 2015 1 0282624

(51) Int. Cl.
*G06F 17/21* (2006.01)
*G06F 3/041* (2006.01)
(Continued)

(52) U.S. Cl.
CPC ............ *G06F 17/214* (2013.01); *G06F 3/041* (2013.01); *G06F 3/16* (2013.01); *G06F 16/685* (2019.01);
(Continued)

(58) Field of Classification Search
CPC .......... G06F 17/214; G06F 3/041; G06F 3/16; G06T 7/00; G06T 2207/30241; H04L 51/04
See application file for complete search history.

(56) References Cited

U.S. PATENT DOCUMENTS 6,150,598 A * 11/2000 Suzuki ................... G10H 7/008
84/603
6,785,649 B1 * 8/2004 Hoory ..................... G10L 13/08
704/235
(Continued)

FOREIGN PATENT DOCUMENTS

| CN | 1892817 A | 1/2007 |
|---|---|---|
| CN | 102609969 A | 7/2012 |
| CN | 104834750 A | 8/2015 |

*Primary Examiner* — Chong Wu
(74) *Attorney, Agent, or Firm* — Mark M. Friedman

(57) ABSTRACT

Disclosed in the present invention is a character curve generating method and device thereof. The method comprises the following steps: (1) inputting text information, and the text information comprises m characters; (2) performing voice input to generate an audio file; (3) dividing the audio file into m equal time periods and calculating a corresponding sound volume of each time period; (4) calculating dimension information corresponding to each character in the text information according to the sound volumes of different time periods in the audio file; and (5) changing display sizes of the m characters in the text information according to the dimension information acquired in step (4) to form a character curve. The text curve formed by multiple characters in different font sizes generates a more interesting image and provides more information compared to text information in a single font size in the existing instant communication system.

7 Claims, 6 Drawing Sheets

(51) Int. Cl.
*G06F 3/16* (2006.01)
*G06T 7/00* (2017.01)
*H04L 12/58* (2006.01)
*G06T 11/20* (2006.01)
*G06F 16/683* (2019.01)

(52) U.S. Cl.
CPC ................ *G06T 7/00* (2013.01); *G06T 11/20* (2013.01); *H04L 51/04* (2013.01); *G06T 2207/30241* (2013.01)

(56) References Cited

U.S. PATENT DOCUMENTS

| | | | |
|---|---|---|---|
| 2004/0202117 A1* | 10/2004 | Wilson | H04L 12/1827 370/310 |
| 2006/0122842 A1* | 6/2006 | Herberger | G10H 1/368 704/278 |
| 2006/0293890 A1 | 12/2006 | Blair et al. | |
| 2009/0254578 A1* | 10/2009 | Hall | G06F 17/30796 |
| 2012/0044267 A1 | 2/2012 | Fino | |

* cited by examiner

Baby! I love you so much. Muah muah muah!

Text information: Baby! I love you so much. Muah muah muah!
Dimension information: 28, 36, 28, 28, 36, 44, 28, 24, 24, 32, 36, and 40

Baby! I love you so much. Muah muah muah!

Font size -> 18 24 16 18 24 32 16 12 12 20 24 28

CHARACTER CURVE GENERATING METHOD AND DEVICE THEREOF

BACKGROUND

Technical Field

The present invention relates to a character curve generating method and a device thereof, and in particular, to a character curve generating method implemented based on voice input or curve input by means of drawing through a touch screen, and a device thereof.

Related Art

In recent years, with the popularization of instant messaging systems, application software such as QQ, WeChat, or MSN has been gradually accepted by the majority of users. When using such application software, a user usually needs to input a large quantity of words/characters into the application software. To make content to be input more interesting, express special meanings, or enrich content to be input, sometimes the user hopes that vivid emoticon icons can be inserted for outputting, while at some moments, to explicitly express key points, the user further hopes that font sizes can be adjusted for outputting.

In the prior art, when a font size in text information needs to be adjusted, a user usually needs to select different font sizes to set a size of a text. When the user hopes that different parts of a sentence are displayed in different font sizes, the user usually needs to separately set font sizes of different texts, and needs to repeat the font size setting operation for multiple times because the operations cannot be completed at one time.

In addition, in the existing instant messaging system, when a font size is adjusted by means of format setting, usually only a size of the entire text information in an input window can be adjusted, that is, the size of the entire text information is modified, but sizes of some words/characters cannot be individually modified. Consequently, key points of expression by the user cannot be highlighted.

SUMMARY

A technical problem to be resolved by the present invention is to provide a character curve generating method and a device thereof.

To achieve the foregoing objective of the invention, the following technical solutions are used in the present invention:

According to a first aspect of embodiments of the present invention, a character curve generating method is provided, the character curve referring to text formed by characters of different sizes, where the method comprises the following steps:

(1) inputting text information, where the text information comprises m characters;

(2) performing voice input to generate an audio file;

(3) dividing the audio file into m equal time periods and calculating a corresponding sound volume of each time period;

(4) calculating dimension information corresponding to each character in the text information according to sound volumes of different time periods in the audio file; and (5) changing display sizes of the m characters in the text information according to the dimension information acquired in step (4) to form the character curve.

Preferably, in step (3), each character corresponds to multiple sample values, all the sample values are converted into PCM codes, absolute values of this set of PCM codes are compared, to find the maximum value, and the maximum value is stored as a sound volume of the time period.

Preferably, in step (4), calculating dimension information of characters in the text information according to sound volumes of the m time periods comprises the following steps:

(41) reading q font sizes forming the character curve;

(42) setting the minimum PCM value to $P_{min}$ and the maximum PCM value to $P_{max}$; and

(43) calculating PCM values $P_n$ respectively corresponding to the q font sizes by using the following formula:

$$P_n = P_{min} + (n-1)*d, \text{ where}$$

$$d = (P_{max} - P_{min})/(q-1), \text{ and } n=1, \ldots, \text{ and } q; \text{ and}$$

(44) calculating a font size according to a PCM value corresponding to each character, where when the corresponding PCM value is between $P_n$ and $P_{n-1}$, if the PCM value$\geq (P_n - P_{n-1})/2$, a font size corresponding to $P_n$ is used for the character; or if the PCM value$< (P_n - P_{n-1})/2$, a font size corresponding to $P_{n-1}$ is used for the character.

Preferably, step (41) comprises steps of setting the minimum font size of the character curve and setting a font size difference between two adjacent sizes.

Preferably, in step (2), a user records, by touching a record button icon, a brief voice recoding to generate an audio file, where content in the voice recording corresponds to content in the text information.

Preferably, in step (2), a user records, by touching a record button icon, a brief voice recoding to generate an audio file, where a storage type of the audio file is an AMR format file or a G.711 format file.

According to a second aspect of the embodiments of the present invention, a character curve generating method is provided, the character curve referring to text formed by characters of different sizes, where the method comprises the following steps:

(1) inputting text information, where the text information comprises m characters;

(2) performing curve input by means of drawing by touching and sliding a touch screen, and recording a pixel (x, y) trajectory of the entire curve;

(3) dividing the curve into m equal intervals, calculating an average value of y-coordinate values of all pixels in each interval, and using the average value as a height value of the interval;

(4) calculating dimension information corresponding to each character in the text information according to height values of different intervals; and (5) changing display sizes of the m characters in the text information according to the dimension information acquired in step (4) to form the character curve.

Preferably, in step (4), calculating dimension information of characters in the text information according to height values of the m intervals comprises the following steps:

(41) reading q font sizes forming the character curve;

(42) setting the minimum average value of y to $Y_{min}$ and the maximum average value of y to $Y_{max}$;

(43) calculating values $Y_n$ of y respectively corresponding to the q font sizes by using the following formula:

$$Y_n = Y_{min} + (n-1)*d, \text{ where}$$

$$d = (Y_{max} - Y_{min})/(q-1), \text{ and } n=1, \ldots, \text{ and } q; \text{ and}$$

(44) calculating a font size according to an average value of y corresponding to each character, where when the corresponding average value of y is between $Y_n$ and $Y_{n-1}$, if the average value of $y \geq (Y_n - Y_{n-1})/2$, a font size corresponding to $Y_n$ is used for the character; or if the average value of $y < (Y_n - Y_{n-1})/2$, a font size corresponding to $Y_{n-1}$ is used for the character.

Preferably, step (41) comprises steps of setting the minimum font size of the character curve, and setting a font size difference between two adjacent sizes.

According to a third aspect of the embodiments of the present invention, an instant messaging device is provided, including:

a processor; and a memory, configured to store an executable instruction of the processor, where the processor is configured to perform the character curve generating method described above.

According to a fourth aspect of the embodiments of the present invention, an instant messaging system is provided, including:

a server and at least two terminals, where the terminal is connected to the server by using a wired network or a wireless network, where the terminal is the instant messaging device described above.

According to a fifth aspect of the embodiments of the present invention, a non-transitory computer readable storage medium is provided, when an instruction in the storage medium is executed by a processor of an instant messaging device, the instant messaging device performs the character curve generating method described above.

The character curve generating method and the device thereof that are disclosed in the present invention may be implemented based on voice input, or may be implemented based on curve input by means of drawing through a touch screen. This can form at one time a text curve formed by multiple characters of different font sizes, and such a text curve generates a more interesting image, highlights key points, and provides more information compared with text information in a single font size in the existing instant messaging system, and therefore, can more accurately and sufficiently represent emotions and intentions of a user.

DETAILED DESCRIPTION

Technical content of the present invention is further described in detail below with reference to the accompanying drawings and specific embodiments.

Figures 1, 2, 3:
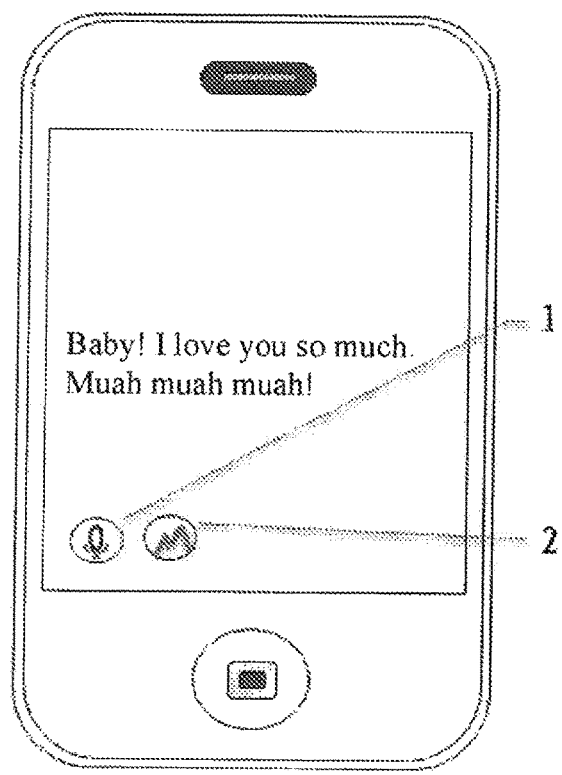
FIG. 1 is an example of a character curve formed based on voice input or curve input by means of drawing through a touch screen.
FIG. 2 is an example of text information and dimension information that correspond to the character curve shown in FIG. 1.
FIG. 3 is an example of an application interface used to implement a text curve generating method.

A character curve generating method provided in the embodiments of the present invention is applied to forming, on a client, a text formed by multiple characters of different sizes shown in FIG. 1, that is, a character curve. Compared with a text of a single size, a text curve provided in the present invention is represented in a more vivid form, and key points are highlighted, facilitating understanding and acceptance by a user. The character curve shown in FIG. 1 comprises text information and dimension information that are shown in FIG. 2. When different clients interact with each other by using a server, data may be transmitted in a text information plus dimension information format. When displayed on a client, the character curve may be directly displayed as a text curve including multiple characters of different sizes.

The character curve generating method provided in the embodiments of the present invention is implemented based on voice input or curve input by means of drawing through a touch screen. After text information is input into a client interface of instant messaging software shown in FIG. 3, first, recording is performed by touching a record button icon 1 to generate an audio file, or touching and line drawing are performed on a screen by touching a touching and sliding button icon 2 to input a curve. Then dimension information of a character is acquired from information about the audio file or the curve. Finally, a character curve is generated by jointly using the text information and the dimension information. Compared with an input manner in which a similar text is acquired by setting font sizes, an input manner of forming a character curve at one time by means of voice input or curve input by drawing through a touch screen is simpler and quicker.

First Embodiment

Specifically, the character curve generating method based on voice input comprises the following steps: (1) inputting text information, where the text information comprises m characters (where m is a positive integer, similarly hereinafter); (2) performing voice input to generate an audio file; (3) dividing the audio file into m equal time periods and calculating a corresponding sound volume of each time period; (4) calculating dimension information corresponding to each character in the text information according to sound volumes of different time periods in the audio file; and (5) changing display sizes of the m characters in the text information according to the dimension information acquired in step (4) to form a character curve.

Figure 4:
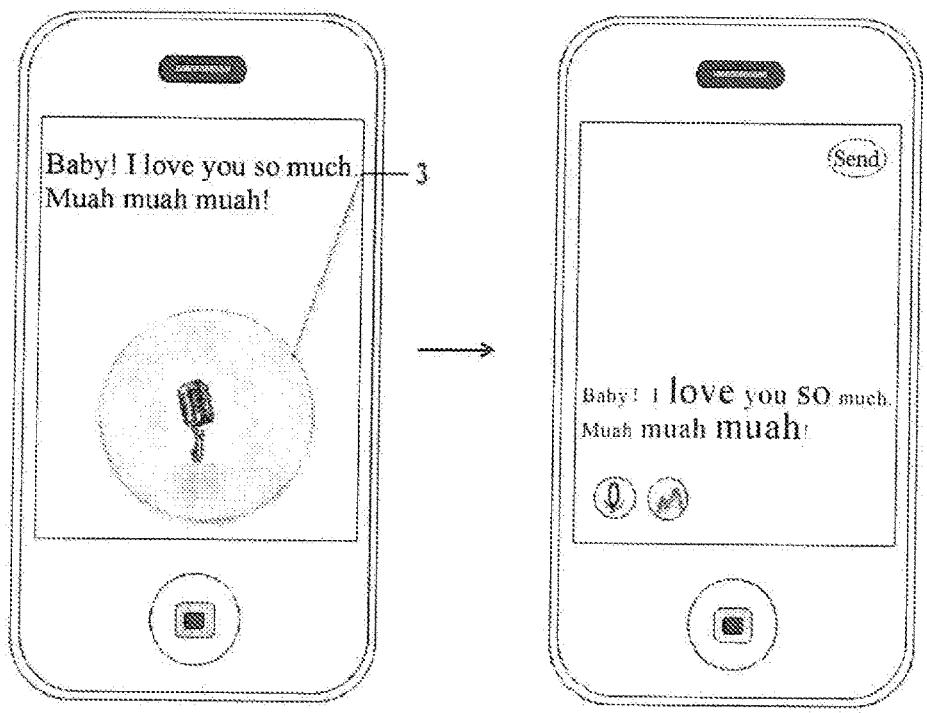
FIG. 4 is an example of a client interface for generating a character curve based on voice input in a first embodiment.

The character curve shown on a screen on the right in FIG. 4 is used as an example for detailed description. In step (1), text information "Baby! I love you so much. Muah muah muah!" of 12 words/characters in total is input, and m=12. In this case, the 12 words/characters are displayed in a same size on an instant messaging interface. In step (2), the record button icon 1 is long pressed to perform recording. In the process of recording, the instant messaging interface displays a recording state as shown in the left figure. When the record button icon 1 is loosened, recording is stopped. Content of the recording may correspond to content of the text information. For example, voice of a user reading the text information character by character is recorded. It is assumed that duration of the recording is 6 seconds, and two characters (x=2) are recorded per second. The client of the instant messaging software automatically generates a voice file by using such voice. An encoding format may be flexibly selected for the voice file, such as an AMR format, or a G.711 format.

Figure 5:
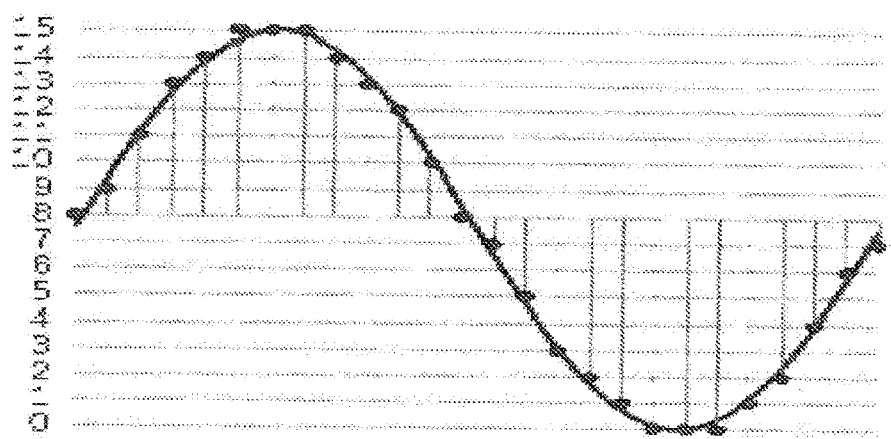
FIG. 5 is a schematic diagram of PCM samples forming a G.711 A-law encoding format.

For ease of description, in this embodiment of the present invention, a G.711 A-law encoding format is used as an example for description. The G.711 A-law encoding generates a bit stream of 64 kbit/s with a sampling frequency of 8 kHz, that is, there are 8000 times of sound sampling per second. Then, each character has an average of 4000 times of sampling, (8000/x=4000). Each sampling is acquired by converting a PCM sample value. The principle of PCM sound sampling is shown in FIG. 5. A magnitude of a sound volume is determined by the amplitude of a wave of PCM sampling. Therefore, the amplitude of a wave corresponding to each character may be acquired by using an algorithm shown in FIG. 6, and the amplitude is converted into a size corresponding to each character.

Figures 6, 7:
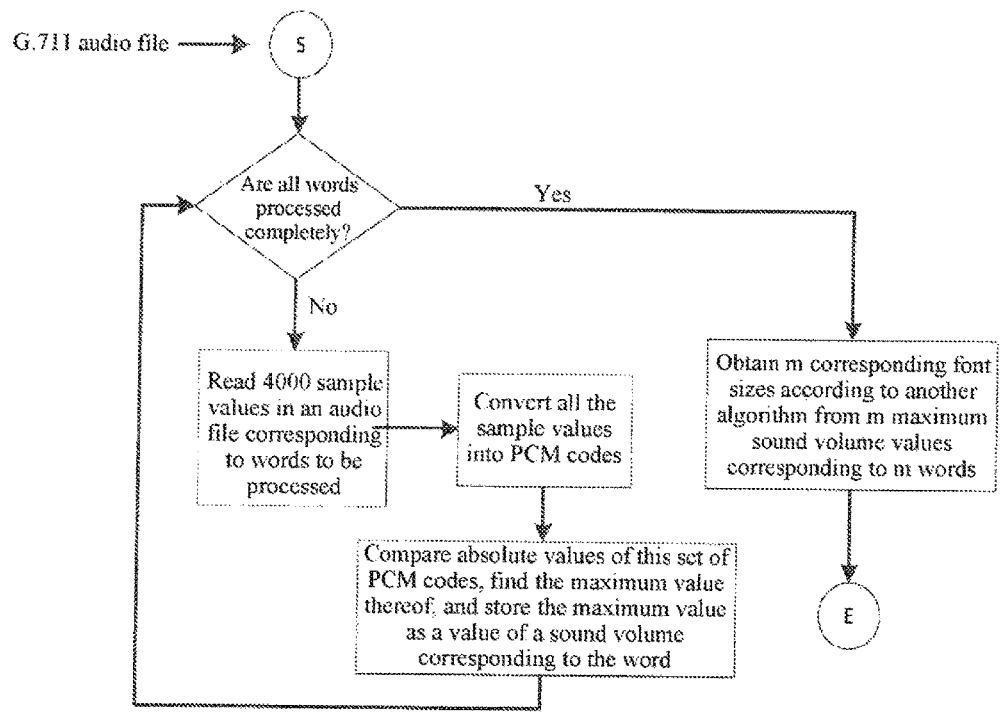
FIG. 6 is a processing flowchart for generating dimension information from a voice file.
FIG. 7 is a correspondence example of generating the text curve according to the dimension information.

As shown in FIG. 6, in step (3), each character corresponds to N sample values (where N is a positive integer; and in this embodiment, N=4000). All sample values corresponding to a same character are converted into PCM codes, and absolute values of this set of PCM codes are compared, to find the maximum value, and the maximum value is stored as a sound volume of the time period, that is, a sound volume corresponding to a same character. Data in an audio file is sequentially processed, to obtain sound volumes of time periods corresponding to all the characters, and then step (4) is performed. In step (4), the dimension information of each character in the text information is calculated according to sound volumes of 12 time periods.

A detailed process of calculating dimension information of each character in step (4) is described below with reference to a character curve shown in FIG. 7. (41) Read q (where q is a positive integer, similarly hereinafter) font sizes forming the character curve. In this process, a step of setting the minimum font size and a step of setting a font size difference between two adjacent font sizes may further be comprised. It is assumed that the character curve is formed by q font sizes, and a difference between every two adjacent font sizes is x. The minimum font size may be randomly set to a value. For example, a default font size set by the user on the instant messaging interface may be directly used, or the minimum font size is reset by the user. In the embodiment shown in FIG. 7, the character curve is formed by six font sizes. The minimum font size is 12, and a difference between every two adjacent font sizes is 4. In this case, the six font sizes are respectively 12, 16, 20, 24, 28, and 32. (42) Set the minimum PCM value acquired through calculation in step (3) to $P_{min}$ and the maximum PCM value to $P_{max}$. In FIG. 7, $P_{min}=3$, and $P_{max}=18$. (43) Calculate PCM values $P_n$ respectively corresponding to the q font sizes: $P_n=P_{min}+(n-1)*d$, where $d=(P_{max}-P_{min})/(q-1)$, and n=1, . . . , and q. In this embodiment, q=6, $P_1=3$, $P_2=6$, $P_3=9$, $P_4=12$, $P_5=15$, and $P_6=18$. The foregoing six PCM values respectively correspond to the six font sizes. (44) Calculate a corresponding font size according to a PCM value corresponding to each character. When the corresponding PCM value is between $P_n$ and $P_{n-1}$, if the PCM value$\geq(P_n-P_{n-1})/2$, a font size corresponding to $P_n$ is used for the character; or if the PCM value$<(P_n-P_{n-1})/2$, a font size corresponding to $P_{n-1}$ is used for the character. In FIG. 7, font sizes of the 12 words/characters are respectively 16, 24, 16, 16, 24, 32, 16, 12, 12, 20, 24, and 28. It can be learned by comparing the character curve shown in FIG. 2 with the character curve shown in FIG. 7 that, FIG. 2 and FIG. 7 separately shows the character curves acquired based on a same recording, and used minimum font sizes are different. In the character curve shown in FIG. 2, the minimum font size is 24, and in the character curve shown in FIG. 7, the minimum font size is 12.

Second Embodiment

The character curve generating method based on curve input by means of drawing through a touch screen comprises the following steps:

(1) inputting text information, where the text information comprises m characters; (2) performing curve input by means of drawing by touching and sliding a touch screen, and recording a pixel (x, y) trajectory of the entire curve; (3) dividing the curve into m equal intervals, calculating an average value of y-coordinate values of all pixels in each interval, and using the average value as a height value of the interval; (4) calculating dimension information corresponding to each character in the text information according to height values of different intervals; and (5) changing display sizes of the m characters in the text information according to the dimension information acquired in step (4) to form the character curve.

Figure 8:
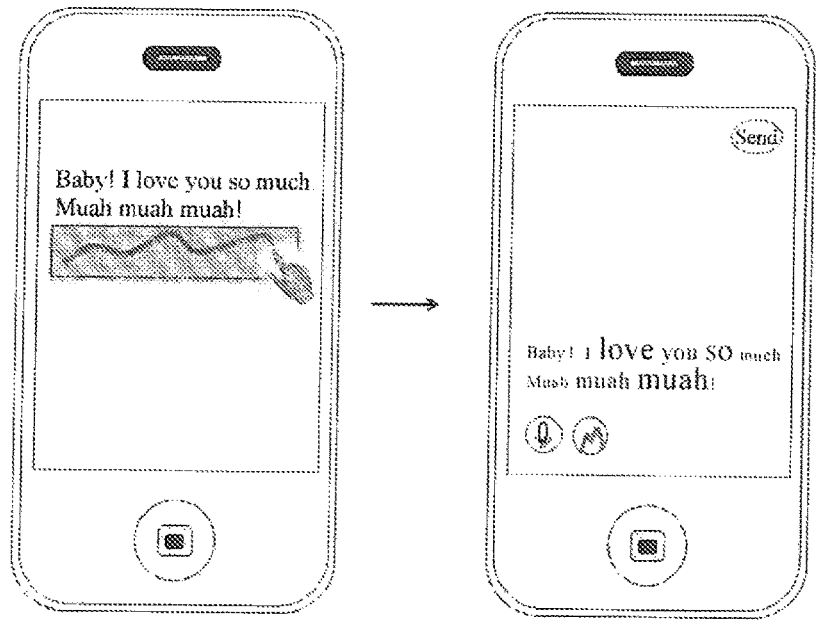
FIG. 8 is an example of a client interface for generating a character curve based on curve input by means of drawing through a touch screen in a second embodiment.
Figure 9:
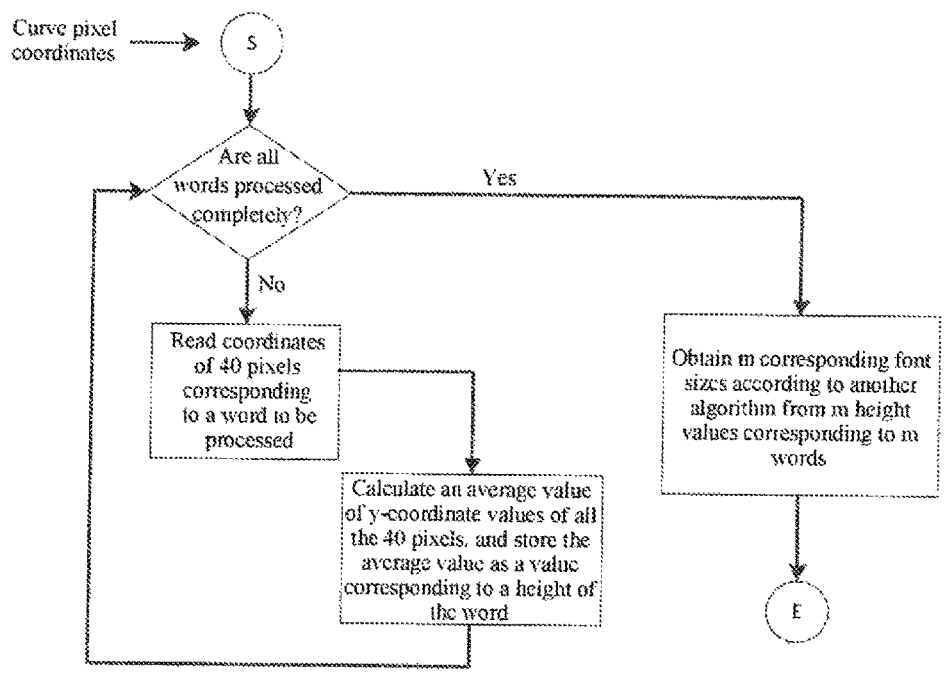
FIG. 9 is a processing flowchart for generating dimension information from curve pixel coordinates.

A communications interface used for implementing the character curve generating method is shown in FIG. 8, touching and line drawing are performed on a screen by touching a touching and sliding button icon 2 to input a curve. It can be learned with reference to the processing flowchart shown in FIG. 9 that, pixel coordinates of points in the curve are collected to generate the dimension information of the character.

The character curve shown on a screen on the right in FIG. 8 is used as an example for description. In step (1), text information "Baby! I love you so much. Muah muah muah!" of 12 words/characters in total is input, and m=12. In this case, the 12 words/characters are displayed in a same size on an instant messaging interface. In step (2), the touching and sliding button icon 2 is touched, and curve input is performed by touching and sliding in a given curve box. The client of the instant messaging software records a pixel (x, y) trajectory of the entire curve. Assuming that the length of the curve is 480 pixels, each curve segment of 40 pixels corresponds to one character. In step (3), coordinates of 40 pixels corresponding to a same character are read, an average value of y-coordinate value of all the 40 pixels are acquired, and the average value is stored and used as a height value of the interval, that is, a corresponding value of the font size of the character is calculated. In step (4), dimension information corresponding to each character in the text information is calculated according to height values of the 12 intervals. The detailed process of calculating the dimension information of each character according to height values of different intervals in the curve in step (4) is similar to the process of calculating font dimension information according to sound volumes in the first embodiment.

The character curve shown in FIG. 8 is used as an example. (41) Read q font sizes forming the character curve, where different font sizes correspond to different average values of y. In this process, a step of setting the minimum font size and a step of setting a font size difference between two adjacent font sizes may further be comprised. It is assumed that the character curve is formed by q font sizes, and a difference between every two adjacent font sizes is x. The minimum font size may be randomly set to a value. For example, a default font size set by the user on the instant messaging interface may be directly used, or the minimum font size is reset by the user, and then q font sizes may be acquired. (42) Set the minimum average value of y acquired through calculation in step (3) to $Y_{min}$ and the maximum average value of y to $Y_{max}$. (43) Calculate values $Y_n$ of y respectively corresponding to the q font sizes by using the following formula: $Y_n=Y_{min}+(n-1)*d$, where $d=(Y_{max}-Y_{min})/(q-1)$, and n=1, . . . , and q. (44) Calculate a corresponding font size according to an average value of y corresponding to each character, where when the corresponding average value of y is between $Y_n$ and $Y_{n-1}$, if the average value of $y \geq (Y_n-Y_{n-1})/2$, a font size corresponding to $Y_n$ is used for the character; or if the average value of $y<(Y_n-Y_{n-1})/2$, a font size corresponding to $Y_{n-1}$ is used for the character.

The two character curve generating methods provided in the embodiments of the present invention are described above. A character curve form by characters of different font sizes may be formed at one time by means of voice input or curve input by means of drawing through a touch screen. A relatively large font size is used to display content that is more important and emphasized by a user. Therefore, the user has good editing experience, and input efficiency is high. Compared with an input manner that is widely used in the existing instant messaging system and in which only a display font size in the instant messaging interface can be centrally adjusted and only text information of a same font size can be input at a single time, the foregoing character curve generating method has richer representation forms, and can more accurately express real emotions and intentions of a user.

Figure 10:
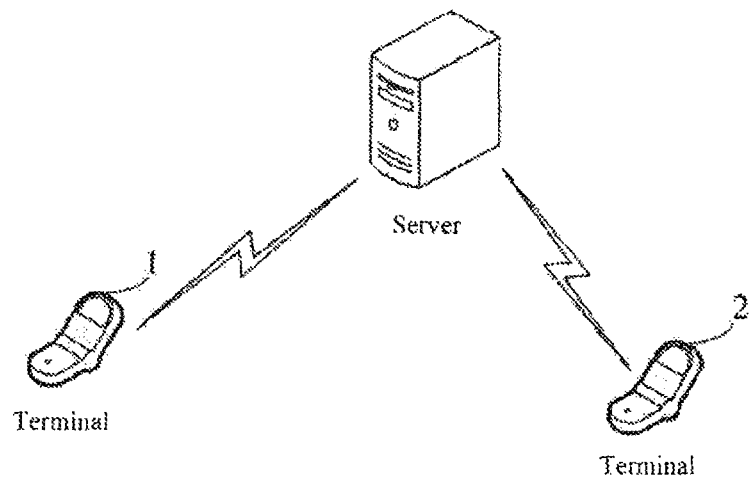
FIG. 10 is a schematic diagram of an instant messaging system shown according to an exemplary embodiment.

FIG. 10 is a schematic diagram of an instant messaging system shown according to an exemplary embodiment. As shown in FIG. 10, the instant messaging system comprises a server and at least two terminals, for example, a terminal 1 and a terminal 2 in FIG. 10. The terminal 1 and the terminal 2 may be devices having a network connection function, such as a smart phone, a computer, a multimedia player, an e-reader, or a wearable device. The server may be one server, or a server cluster including several servers, or a cloud computing service center. The at least two terminals and the server may be connected to each other by using a wired network or a wireless network. Assuming that a client of instant messaging software (such as QQ, WeChat, or Skype) is installed in each of the terminal 1 and the terminal 2, the terminal 1 may have an instant messaging conversation with the instant messaging software installed in the terminal 2 by using the server and according to the instant message software installed in the terminal. In this case, when a character curve is formed on a client interface of the terminal 1, text information and dimension information that form the character curve are associated with each other and sent to the server, and are sent to another client (for example, a client of the terminal 2) by using the server, to implement a process of interaction between different users.

Figure 11:
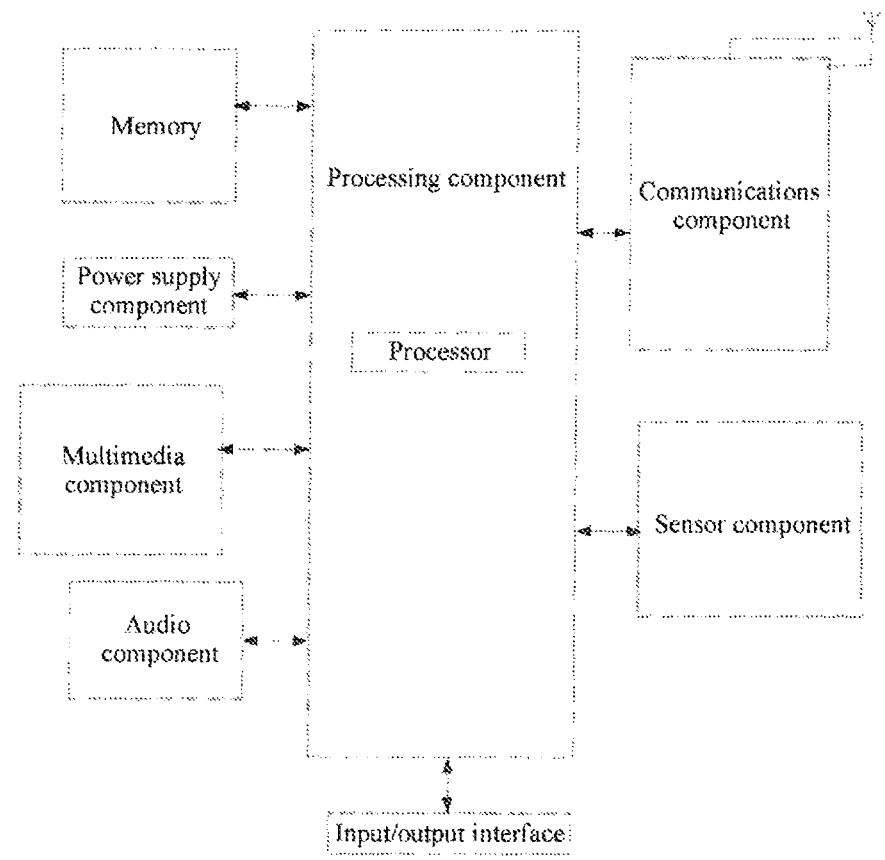
FIG. 11 is a block diagram of an instant messaging device shown according to an exemplary embodiment.

FIG. 11 is a block diagram of an instant messaging device (that is, the terminal in FIG. 10) shown according to an exemplary embodiment. The instant messaging device may be a smart phone, a computer, a digital broadcasting terminal, a message transceiver, a game controller, a tablet device, a medical device, a fitness facility, a personal digital assistant, or the like. Referring to FIG. 11, the instant messaging device may comprise one or more of the following components: a processing component, a memory, a power supply component, a multimedia component, an audio component, an input/output (I/O) interface, a sensor component, and a communications component.

The processing component generally controls integral operations of the device, such as operations related to displaying, a phone call, data communication, a camera operation, and a record operation. The processing component may comprise one or more processors to execute instructions, so as to complete all or some steps of the foregoing method. In addition, the processing component may comprise one or more modules, to facilitate interaction between the processing component and other components. For example, the processing component may comprise a multimedia module, to facilitate interaction between the multimedia component and the processing component.

The memory is configured to store data of various types to support operations on the instant messaging device. Examples of the data comprise instructions of any application program or method that are used for operations on the instant messaging device, contact data, address book data, a message, a picture, a video, and the like. The memory may be implemented by a volatile or non-volatile storage device of any type or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc.

An electric power component provides electric power for various components of the instant messaging device. The electric power component may comprise a power supply management system, one or more power supplies, and other components related to generation, management, and allocation of power for the instant messaging device.

The multimedia component comprises a screen that is between the instant messaging device and a user and that provides an output interface. In some embodiments, the screen may comprise a liquid crystal display (LCD) and a touch panel (TP). If the screen comprises the touch panel, the screen may be implemented as a touch screen to receive an input signal from the user. The touch panel comprises one or more touch sensors to sense a touch, a slide, and a gesture on the touch panel. The touch sensor may not only sense a perimeter of a touch or slide operation, but also detect duration and pressure related to the touch or slide operation. In some embodiments, the multimedia component comprises a front-facing camera and/or a rear-facing camera. When the instant messaging device is in an operating mode, such as a shooting mode or a video mode, the front-facing camera and/or the rear-facing camera may receive external multimedia data. The front-facing camera and the rear-facing camera each may be a stationary optical lens system or have capabilities of a focus length and optical zoom.

The audio component is configured to output and/or input an audio signal. For example, the audio component comprises a microphone (MIC). When the instant messaging device is in the operating mode, such as a call mode, a record mode, and a speech recognition mode, the microphone is configured to receive an external audio signal. The received audio signal may further be stored in the memory or be sent by using the communications component. In some embodiments, the audio component further comprises a speaker, configured to output an audio signal.

The I/O interface provides an interface between the processing component and a peripheral interface module. The peripheral interface module may be a keyboard, a click wheel, a button, or the like. The button may comprise, but is not limited to: a home button, a sound volume button, a start-up button, and a lock button.

The sensor component comprises one or more sensors, configured to provide a status assessment in each aspect for the instant messaging device. For example, the sensor component may detect a power-on/off state of the instant messaging device and relative positioning of components. For example, the components are a display and a keypad of the instant messaging device. The sensor component may further detect changes in a location of the instant messaging device or a location of a component of the instant messaging device, whether there is a touch between the user and the instant messaging device, and an azimuth or acceleration/deceleration of the instant messaging device and changes in a temperature of the instant messaging device. The sensor component may comprise a proximity sensor, configured to detect an adjacent object without any physical contact. The sensor component may further comprise an optical sensor, such as a CMOS or CCD image sensor, used in imaging application. In some embodiments, the sensor component may further comprise an acceleration sensor, a gyro sensor, a magnetic sensor, a pressure sensor, or a temperature sensor.

The communications component is configured to facilitate communication between the instant messaging device and other devices in a wired or wireless manner. The instant messaging device may access a communications standard-based wireless network, such as Wi-Fi, 2G, or 3G, or a combination thereof. In an exemplary embodiment, the communications component receives, by using a broadcast channel, a broadcast signal or broadcast-related information from an external broadcast management system. In an exemplary embodiment, the communications component further comprises a near field communication (NFC) module to facilitate short-distance communication. For example, the NFC module may be implemented based on the radio frequency identification (RFID) technology, the Infrared Data Association (IrDA) technology, the ultra-wideband (UWB) technology, the Bluetooth (BT) technology, and other technologies.

In an exemplary embodiment, the instant messaging device may be implemented by using one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, to perform the character curve generating method described above.

In an exemplary embodiment, a non-transitory computer readable storage medium including an instruction, for example, a memory including an instruction, is further provided. The instruction may be executed by a processor of the instant messaging device to implement the method described above. For example, the non-transitory computer readable storage medium may be a ROM, a random access memory (RAM), a CD-ROM, a magnetic tape, a floppy disk, or an optical data storage device.

A non-transitory computer readable storage medium is provided, and when an instruction in the storage medium is executed by a processor of an instant messaging device, the instant messaging device can perform the character curve generating method described above.

To sum up, by means of the instant message device provided in the embodiments of the present invention, in a process of chatting by using a client, a user first inputs text information into the client, where the text information comprises m characters, and m is a positive integer; subsequently, performs voice input into the client to generate an audio file; divides the audio file into m equal time periods and calculates a corresponding sound volume of each time period; calculates dimension information corresponding to each character in the text information according to sound volumes of different time periods in the audio file; and subsequently, changes display sizes of the m characters in the text information according to the dimension information acquired in the foregoing step to form the character curve. Alternatively, the user first inputs text information into the client, where the text information comprises m characters, and m is a positive integer; performs curve input by means of drawing by touching and sliding a touch screen, and records a pixel (x, y) trajectory of the entire curve; divides the curve into m equal intervals, calculates an average value of y-coordinate values of all pixels in each interval, and uses the average value as a height value of the interval; calculates dimension information corresponding to each character in the text information according to height values of different intervals; and changes display sizes of the m characters in the text information according to the dimension information acquired in the foregoing step to form the character curve. Therefore, instant messaging representation forms are enriched.

Figure 12:
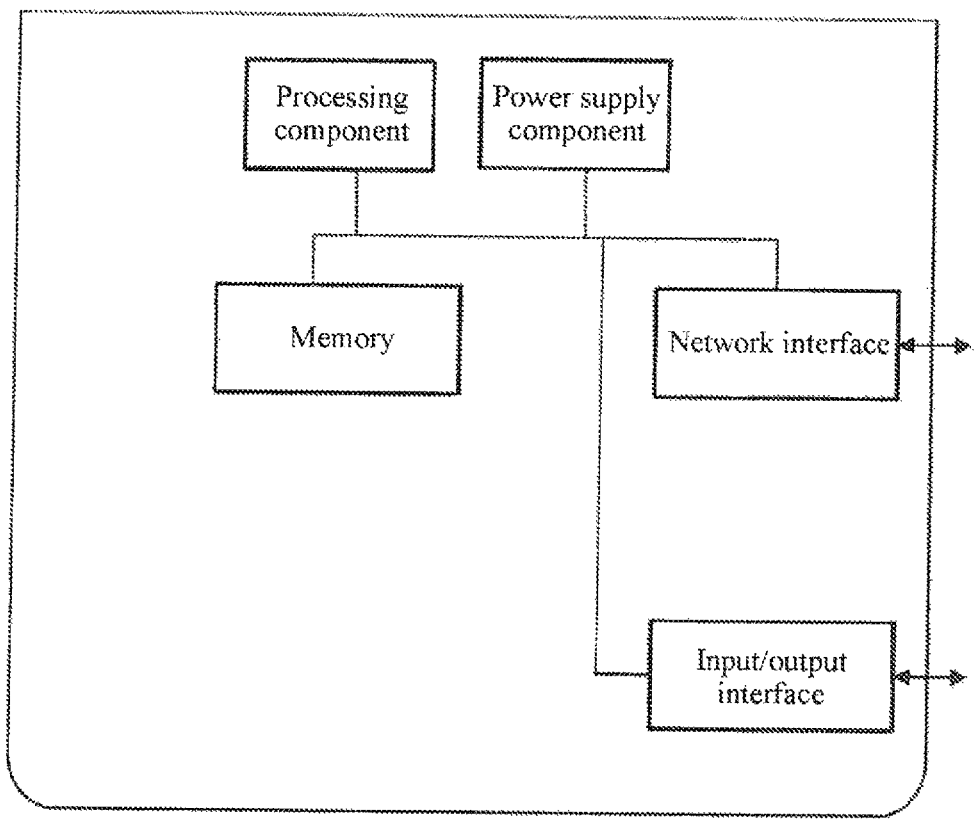
FIG. 12 is a block diagram of a server used for instant messaging shown according to an exemplary embodiment.

FIG. 12 is a block diagram of a server used for instant messaging shown according to an exemplary embodiment. Referring to FIG. 12, the server comprises a processing component, and further comprises one or more processors, and a memory resource represented by a memory, configured to store an instruction that can be executed by the processing component, for example, an application program. The application program stored in the memory may comprise one or more modules, each of which corresponds to a set of instructions. In addition, the processing component is configured to execute instructions, to perform the character curve generating method described above.

The server may further comprise one power supply module, configured to perform power supply management of the server, one wired or wireless network interface, configured to connect the server to a network, and one input/output (I/O) interface. The server may operate an operating system stored in the memory, for example, Windows Server™, Mac OSX™, Unix™, Linux™, or Free BSD™.

The character curve generating method and the device thereof provided in the present invention are described above in detail. Any apparent modifications made by a person of ordinary skill in the art without departing from the essence and spirit of the present invention all constitutes an infringement to the patent rights of the present invention, and shall bear corresponding legal liabilities.

What is claimed is:

1. A character curve generating method, the character curve referring to a text formed by characters of different sizes, wherein the method comprises the following steps:
   (1) inputting text information, wherein the text information comprises m characters, and m is a positive integer;
   (2) performing voice input to generate an audio file;
   (3) dividing the audio file into m equal time periods and each character corresponds to multiple sample values, all the sample values are converted into PCM (Pulse Code Modulation) codes, absolute values of this set of PCM codes are compared, to find a maximum PCM value, and the maximum PCM value is stored as a sound volume of the time period;

(4) calculating dimension information corresponding to each character in the text information according to sound volumes of different time periods in the audio file; wherein the calculating dimension information comprises the following steps:

(41) reading q font sizes forming the character curve, wherein q is a positive integer;

(42) setting a minimum PCM value to $P_{min}$ and the maximum PCM value to $P_{max}$; and

(43) calculating PCM values $P_n$ respectively corresponding to the q font sizes:

$$P_n = P_{min} + (n-1)*d, \text{ wherein}$$

$$d=(P_{max}-P_{min})(q-1), \text{ and } n=1, \ldots, \text{ and } q; \text{ and}$$

(44) calculating a font size according to a PCM value corresponding to each character, wherein when the corresponding PCM value is between $P_n$ and $P_{n-1}$, if the PCM value$\geq (P_n-P_{n-1})/2$, a font size corresponding to $P_n$ is used for the character; or if the PCM value$<(P_n-P_{n-1})/2$, a font size corresponding to $P_{n-1}$ is used for the character; and (5) changing display sizes of the m characters in the text information according to the dimension information acquired in step (4) to form the character curve.

2. The character curve generating method according to claim 1, wherein:

step (41) comprises steps of setting the minimum font size of the character curve and setting a font size difference between two adjacent sizes.

3. The character curve generating method according to claim 1, wherein:

in step (2), a user records, by touching a record button icon, a brief voice recoding to generate an audio file, wherein content in the voice recording corresponds to content in the text information.

4. The character curve generating method according to claim 1, wherein:

in step (2), a user records, by touching a record button icon, a brief voice recoding to generate an audio file, wherein a storage type of the audio file is an AMR format file or a G.711 format file.

5. An instant messaging device, comprising:
a processor; and
a memory, configured to store an executable instruction of the processor, wherein
the processor is configured to perform the character curve generating method according to claim 1.

6. A character curve generating method, the character curve referring to a text formed by characters of different sizes, wherein the method comprises the following steps:

(1) inputting text information, wherein the text information comprises m characters, and m is a positive integer;

(2) performing curve input by means of drawing by touching and sliding a touch screen, and recording a pixel (x, y) trajectory of the entire curve;

(3) dividing the curve into m equal intervals, calculating an average value of y-coordinate (y) values of all pixels in each interval, and using the average value of y as a height value of the interval;

(4) calculating dimension information corresponding to each character in the text information according to height values of different intervals; wherein the calculating dimension information comprises the following steps:

(41) reading q font sizes forming the character curve, wherein q is a positive integer;

(42) setting a minimum average value of to $Y_{min}$ and a maximum average value of y to $Y_{max}$;

(43) calculating values $Y_n$ of y respectively corresponding to the q font sizes:

$$Y_n = Y_{min} + (n-1)*d, \text{ wherein}$$

$$d=(Y_{max}-Y_{min})/(q-1), \text{ and } n=1, \ldots \text{ and } q; \text{ and}$$

(44) calculating a font size according to an average value of y corresponding to each character, wherein when the corresponding average value of y is between $Y_n$ and $Y_{n-1}$, if the average value of y$\geq (Y_n-Y_{n-1})/2$, a font size corresponding to $Y_n$ is used for the character; or if the average value of y$<(Y_n-Y_{n-1})/2$, a font size corresponding to $Y_{n-1}$ is used for the character; and (5) changing display sizes of the m characters in the text information according to the dimension information acquired in step (4) to form the character curve.

7. The character curve generating method according to claim 6, wherein:

step (41) comprises steps of setting the minimum font size of the character curve, and setting a font size difference between two adjacent sizes.

* * * * *